United States Patent [19]

Todd

[11] Patent Number: 6,074,687

[45] Date of Patent: Jun. 13, 2000

[54] HIGH TEMPERATURE COUNTERCURRENT SOLVENT EXTRACTION OF CAPSICUM SOLIDS

[75] Inventor: George N. Todd, Kalamazoo, Mich.

[73] Assignee: Kalamazoo Holdings, Inc., Kalamazoo, Mich.

[21] Appl. No.: 08/966,109

[22] Filed: Nov. 7, 1997

Related U.S. Application Data

[62] Division of application No. 08/766,504, Dec. 13, 1996, Pat. No. 5,773,075.

[51] Int. Cl.$^7$ ...................................................... A23L 1/221
[52] U.S. Cl. .......................... 426/638; 426/651; 426/655; 426/425; 426/429; 426/481
[58] Field of Search .................... 426/478, 481, 426/487, 651, 634, 650, 638, 655, 425, 429

[56] References Cited

U.S. PATENT DOCUMENTS

| | | | |
|---|---|---|---|
| 606,624 | 6/1898 | Gebhardt | 426/638 |
| 2,097,405 | 10/1937 | Hall | 99/230 |
| 2,246,528 | 6/1941 | Musher | 426/540 |
| 2,384,532 | 9/1945 | Bush et al. | 99/140 |
| 2,507,084 | 5/1950 | Ansel | 99/140 |
| 2,529,710 | 11/1950 | Singh | 99/153 |
| 2,571,867 | 10/1951 | Hall et al. | 426/540 |
| 2,571,948 | 10/1951 | Sair et al. | 99/140 |
| 2,615,813 | 10/1952 | Malter | 99/140 |

(List continued on next page.)

OTHER PUBLICATIONS

Rancidity and its Measurement in Edible Oils and Snack Foods, A Review, Robards, Kerr, and Patsalides, *Analyst*, Feb. 1988, vol. 113.

Water Activity and Food Polymer Science: Implications of State on Arrhenius and WLF Models in Predicting Shelf Life, K. A. Nelson & T. P. Labuza, Journal of Food Engineering 22, 271–289 (1994).

Lipid and Antioxidant Content of Red Pepper, Daood, Biacs, et al., Central Food Research Institute, Budapest, Hungary (1989).

The Nature of Fatty Acids and Capsanthin Esters in Paprika, Nawar et al., Journal of Food Science, vol. 36 (1971).

Riegel's Handbook of Industrial Chemistry, 9th Edition, p. 278.

*Primary Examiner*—Cynthia L. Nessler
*Attorney, Agent, or Firm*—The Firm of Gordon W. Hueschen

[57] ABSTRACT

Principal components of paprika, red pepper, pungent chili, or other plants of the genus Capsicum containing carotenoid pigments are simultaneously extracted and concentrated with an edible solvent in a series of mixing and high temperature and pressure mechanical pressing steps using edible solvent and a countercurrent extraction procedure. The extract containing the carotenoid pigments may be hydrated and then centrifuged to remove fine particulate solids and gums. A solution having several times the concentration of the carotenoid pigments and other flavor and aroma components of the starting raw material is obtained. The residual press solids may be cooled and hydrated following the last pressing operation. The residual press solids and extract have significantly reduced bacterial counts as a result of the temperatures, high pressure, and high shear utilized, as well as the low moisture levels employed, thus producing not only a food grade extract but also a food grade residual solid having low bacterial counts and predictable, standardized levels of the principal components of interest. The degree of browning or caramelization of the residual press solids is controlled, and the resistance to oxidative deterioration of the carotenoid pigments of both the extract and the residual solid is improved, by control of the temperature employed. Additionally, edible antioxidants can be included in the solvent to enhance the stability of both the extract and the residual solid.

2 Claims, 2 Drawing Sheets

U.S. PATENT DOCUMENTS

| | | | |
|---|---|---|---|
| 3,071,475 | 1/1963 | Stohr | 426/540 |
| 3,340,250 | 9/1967 | Sair et al. | 260/236.5 |
| 3,647,487 | 3/1972 | Sair | 99/225 |
| 3,732,111 | 5/1973 | Berner | 99/140 |
| 3,908,031 | 9/1975 | Wistreich et al. | 426/335 |
| 3,939,287 | 2/1976 | Orwig et al. | 426/316 |
| 4,060,645 | 11/1977 | Risler, et al. | 426/302 |
| 4,069,351 | 1/1978 | Yano et al. | 426/650 |
| 4,123,559 | 10/1978 | Vitzhum et al. | 426/312 |
| 4,158,708 | 6/1979 | Chiovini et al. | 426/650 |
| 4,198,432 | 4/1980 | Vitzhum et al. | 426/312 |
| 4,210,678 | 7/1980 | BayusiK et al. | 426/521 |
| 4,490,398 | 12/1984 | Behr et al. | 426/312 |
| 4,681,769 | 7/1987 | Bennett, III et al. | 426/540 |
| 4,790,995 | 12/1988 | Sorensen | 426/302 |
| 4,844,933 | 7/1989 | Hsieh et al. | 426/521 |
| 4,847,106 | 7/1989 | Pike et al. | 426/629 |
| 4,910,027 | 3/1990 | Sorensen | 426/93 |
| 4,925,688 | 5/1990 | Voituriez | 426/281 |
| 4,967,651 | 11/1990 | Hsieh et al. | 99/470 |
| 4,985,265 | 1/1991 | Duboo et al. | 426/425 |
| 5,017,397 | 5/1991 | Nguyen et al. | 426/542 |
| 5,026,550 | 6/1991 | Aeschbach et al. | 424/195.1 |
| 5,059,437 | 10/1991 | Todd, Jr. | 426/250 |
| 5,084,293 | 1/1992 | Todd, Jr. | 426/541 |
| 5,120,558 | 6/1992 | Nguyen et al. | 426/425 |
| 5,230,836 | 7/1993 | Todd, Jr. | 252/407 |
| 5,466,459 | 11/1995 | Wilson | 426/407 |
| 5,503,810 | 4/1996 | Chang | 422/235 |
| 5,523,053 | 6/1996 | Dudek | 422/26 |
| 5,525,260 | 6/1996 | Aeschbach et al. | 252/398 |
| 5,773,075 | 6/1998 | Todd | 426/638 |

HIGH TEMPERATURE COUNTERCURRENT SOLVENT EXTRACTION OF CAPSICUM SOLIDS

The present application is a division of my prior-filed application Ser. No. 08/766,504, filed Dec. 13, 1996, now U.S. Pat. No. 5,773,075, issued Jun. 30, 1998.

FIELD OF THE INVENTION

The extraction of the principal significant components of spice plants of the genus Capsicum, representatively paprika, red pepper, and chili, containing carotenoid pigments using edible, food-grade solvent.

BACKGROUND OF THE INVENTION AND PRIOR ART

The present invention relates to a method of increasing the color stability and reducing the microbial counts of both oleoresin Capsicum and the residual cake from which the oleoresin has been extracted. The process simultaneously extracts and concentrates the principal flavor, aroma, color, and other active compounds of the genus Capsicum, produces a concentrated and standardized food-grade extract of active components, and a standardized food-grade residual solid, with both the extract and residual solids having improved resistance to color loss and having significantly reduced microbial counts.

Concentrated extracts of the genus Capsicum are universally used for flavoring and coloring of food, beverages, and pharmaceuticals. These extracts are traditionally used where a standardized, sterile, and uniform concentrate offers the benefits of control which are inherently difficult to obtain from raw spice, or where the bulk of the raw material is not needed or undesirable.

Ground Capsicum solids are universally used for flavoring, coloring, and imparting otherwise favorable characteristics to food and beverages where the bulk, functional characteristics, and appearance of the food or beverage is important.

Traditional extraction processes for the manufacture of concentrated extracts (concentrated several fold as compared with the raw material) involve not only the use of various non-edible solvent systems, but also a large proportion of solvent in relation to the compounds of interest. Many require the use of petroleum distillates, chlorinated solvents, or highly flammable solvents which must be eliminated almost completely from the finished products to make them safe for consumption. These systems require expensive distillation equipment and special precautions must be taken to ensure worker safety and to limit environmental impact. The intensive processing required often destroys, modifies, or loses some of the more unstable compounds, delicate aromas, flavors, or pigments. More significantly, the last traces of undesirable non-edible solvents are very difficult to separate from the concentrated extract. The residual solid must necessarily contain the same residual non-edible solvents, which are removed only with difficulty. Such residual solvents limit the potential use of the residual solid for human consumption, and are potential environmental contaminants.

Other concentration techniques rely on high pressure equipment to obtain good solvating properties from gases, e.g., liquid or supercritical $CO_2$ (U.S. Pat. No. 4,490,398). High pressure liquefied or supercritical gas extraction requires expensive equipment and has limited solvating abilities for some compounds requiring the addition of co-solvents, or solvents such as propane and butane, which are also difficult to control and may be environmentally sensitive or undesirable in a finished product.

Following extraction and desolventization, the concentrated extract is often standardized with edible solvents and emulsifiers to provide a concentrate with reproducible levels of the active or principal compounds of interest to the user.

In an effort to overcome the shortcomings and risks associated with the above-mentioned processes, extraction has been carried out using edible solvents such as vegetable oils or lard. Typical extraction procedures are disclosed in U.S. Pat. Nos. 3,732,111; 2,571,867; and 2,571,948. These methods require a relatively large volume of solvent in relation to the compounds of interest and result in a dilute extract which is limited in its application and which has few of the advantages of the concentrates which can be produced using volatile solvents.

U.S. Pat. No. 4,681,769 discloses a method for simultaneously extracting and concentrating in a series of high pressure countercurrent mechanical presses using relatively small amounts of vegetable oil as the solvent in an attempt to overcome the problem of dilution inherent in earlier processes. This method suffers from severe limitations in temperature and pressure ranges in an attempt to avoid unacceptable oxidative damage, color loss, yield losses, and flavor changes with the final result being that contact times must be unduly extended for up to 16–24 hours, adding greatly to the cost of the process. Extraction cycle times are unduly long for a given size pressing operation, and the process does not provide for a controlled degree of browning or for sterilization of the extract or of the residual solid. It is also limited to temperatures of less than 100° F. and thus it does not allow for the use of edible solvents which have a melting point of more than 100° F. or which are highly viscous at temperatures of less than 100° F. Maximum pressures of up to about 500 PSI (cone pressure) are claimed and this severely limits the efficiency and throughput rate for a given size pressing operation, as shown by the disclosure of this patent.

Traditional methods for the sterilization of ground spices, including Capsicum, involve the use of extremely toxic substances such as ethylene oxide or methyl bromide, irradiation, or steam and moisture treatment to reduce plate counts to less than 100,000. Chemical sterilization and irradiation of spices are disagreeable to the consumer because of the perceived risk of residual chemicals and/or radiation remaining in the plant matter and, as a result, several processes using added moisture, such as water or steam, at elevated pressures have been developed as alternatives. Typical sterilization procedures are disclosed in U.S. Pat. Nos. 4,210,678, 4,790,995, and 4,910,027. All sterilization processes are inherently costly in that they require a separate processing step or steps to accomplish the sterilization, and also present the possibility of further degrading the more unstable components. Addition of moisture or water vapor, as disclosed in U.S. Pat. Nos. 4,210,678 and 4,910,027, prior to or during the heating and sterilization process results in a cooked aroma not typical of the fresh, dehydrated spice and also results in steam distillation and loss of some of the volatile flavor and aroma constituents.

U.S. Pat. Nos. 4,790,995 and 4,910,027 require the addition of a coating of animal protein to protect the spice from the loss of volatile aroma compounds during the sterilization process with water vapor. U.S. Pat. No. 4,210,678 requires bringing the moisture of the spice to above 8–14%, in some cases up to 16–20%, and holding the spice for an extended period of time prior to sterilization to equilibrate the moisture. This additional step is costly and time consuming. In the case of Capsicums, severe browning and off aromas and flavors are developed in the presence of moistures in excess of 8% at elevated temperatures above 180° F.

Traditional methods for controlling the brownness or degree of caramelization of Capsicum solid to enhance its visual appearance involve the use of elevated temperatures and the addition of vegetable or animal fats or oils to bring up the surface color and luster of the ground spice. This requires a separate and costly processing operation.

Above all, there is the unsolved problem of obtaining satisfactory yields, quality, and throughput rates of acceptable extract having an acceptable content of active principle in the edible solvent without undesirable oxidative damage to, and reduced stability of, the principal compounds of interest, while at the same time providing for simultaneous sterilization of both the spice solid and extract.

Obviously, existing prior art procedures leave much to be desired, and it is a primary objective of the present invention to provide a procedure for the production of Capsicum products having enhanced color stability and which otherwise obviates the shortcomings of the prior art.

OBJECTS OF THE INVENTION

Accordingly, it is an object of the present invention to provide a process for simultaneously and rapidly extracting and concentrating the principal components of Capsicum solids, at temperatures of at least 130° F., preferably 130 to about 450° F., in a process which is completely free of petroleum, chlorinated or highly flammable solvent, does not require high pressure gas handling equipment, does not require distillation for solvent removal, uses only food-grade edible solvents which are typically used in the trade to standardize the resulting extract to a desired concentration, and provides a product which is free of adulterants and impurities.

Another object of this invention is to prepare such a concentrated extract by a process which is simple, environmentally friendly, and economical.

A further object of this invention is to prepare a residual solid or press cake which is edible, free of residual petroleum distillates, chlorinated solvent, or other adulterants, which is standardized with respect to the principal components of commercial interest, which has a predictable and controlled degree of brownness or caramelization, and which has a controlled level of water activity with its attendant increased resistance to oxidative deterioration of the carotenoid pigments and color loss.

A still further object of this invention is to provide such a process wherein antioxidants can be added to the edible solvent system so as to protect the concentrated extract and the residual solids against oxidative degradation of the principal components of interest, i.e., flavor, aroma, and color, which are extracted from the raw plant material or left in the residual solids.

Still a further object of this invention is to prepare an edible extract and an edible residual solid with reduced microbial activity by a process wherein the moisture of the Capsicum spice is kept below 8%, thereby avoiding the loss of volatile flavor and aroma constituents and avoiding the development of uncontrolled browning and off flavor development at temperatures in excess of 130° F. which are necessary to effect high extraction efficiencies, reduction in microbial activity, and improved stability of the carotenoid pigments in both the extract and in the residual solids.

Yet a further object of this invention is to prepare an extract with increased resistance to oxidative degradation of the carotenoid pigments and consequent color loss.

Other objects will be apparent to one skilled in the art to which this invention pertains and still others will become apparent hereinafter as the description proceeds.

SUMMARY OF THE INVENTION

Figure 1:
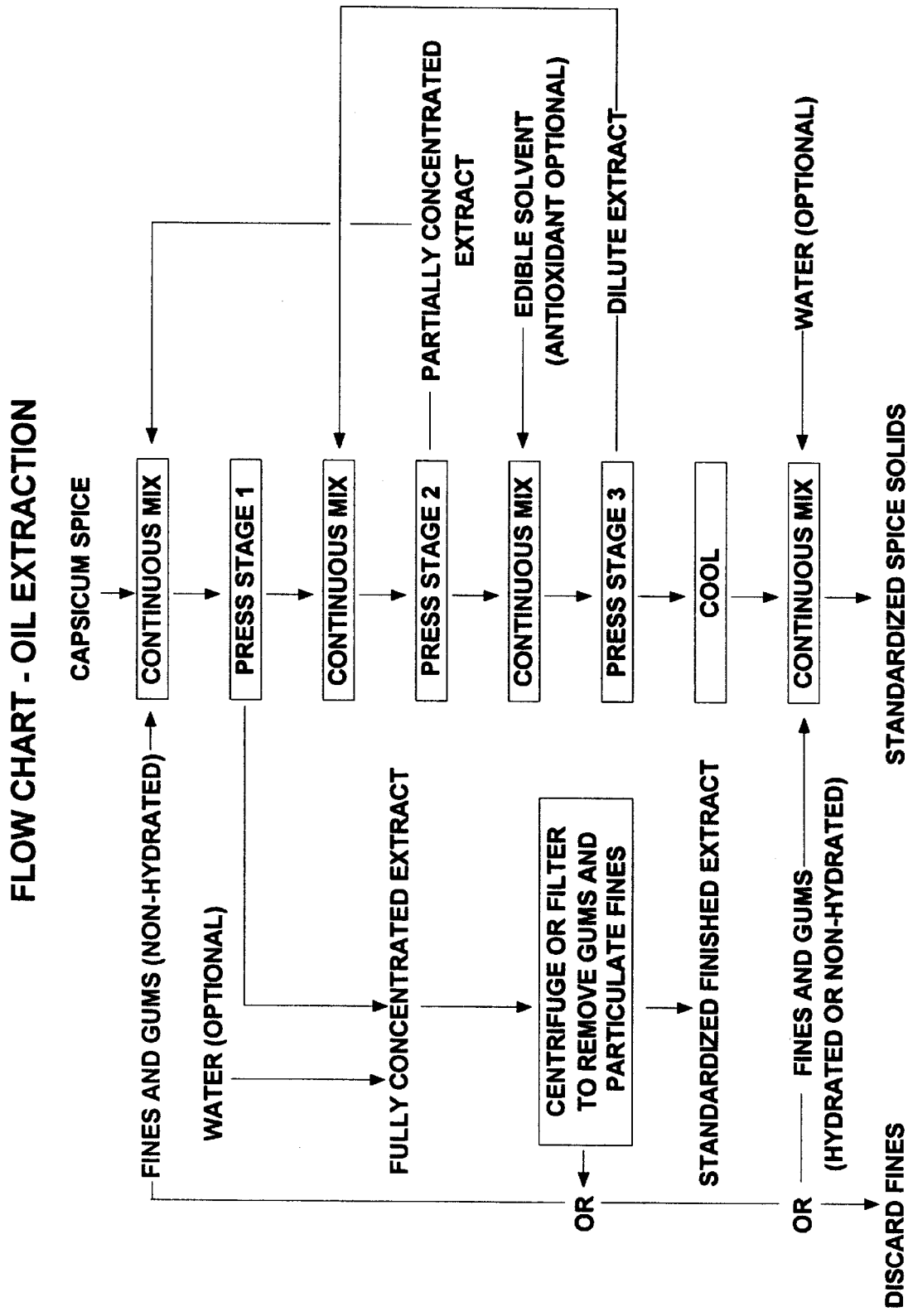
FIG. 1 illustrates the process of the present invention, including the several process steps involved in the simultaneous extraction and concentration of Capsicum solids, to produce the desired extract and sterilized residual solid, both of which have increased resistance to oxidative degradation, and which can be readily standardized to desired levels of the principal components of interest. Although the process illustrated comprises three extraction stages, the number of stages can be decreased to two or increased to more than three to effect the desired relative principal component concentration in the extract and in the residual solid.

The invention, then, inter alia, comprises the following, alone or in combination:

A continuous multistage mixing, high pressure pressing, and countercurrent extraction process for the production of a concentrated edible extract and edible residual solids, both of reduced bacterial content, with the extract having enhanced resistance to oxidative deterioration of carotenoid pigments therein, and both of which contain carotenoid pigments, flavor, and aroma, from plant material solids of the genus Capsicum, comprising the following steps:

subjecting said Capsicum solids to a countercurrent extraction process involving a plurality of mixing and pressing stages, including first and last mixing stages and first and last pressing stages, together with five to about fifty percent by weight of an edible solvent, to produce an extract and residual solids, continuously returning the extract from each pressing stage to the previous mixing stage, and finally separating the extract from the first pressing stage and separating the residual solids from the last pressing stage, all pressing stages being carried out at a temperature of at least 130° F.; such a process, wherein the temperature is 130 to about 450° F.; such a process, wherein the Capsicum solids are subjected to internal pressures in the press stages of at least 6,000 pounds per square inch; such a process, wherein the weight of the edible solvent is 5% to about 20% by weight of the Capsicum solids; such a process, wherein the moisture content of the starting Capsicum solids is less than 6% by weight, and wherein bacterial count reduction is effected at this low moisture content, thereby avoiding undesirable loss of volatile flavor and aroma constituents and avoiding the development of cooked, off flavors and aromas which occur at higher moisture contents; such a process, wherein the Capsicum solids extracted in the process are selected from the group consisting of paprika, red pepper, and chili; such a process, wherein the edible solvent is selected from the group consisting of soybean oil, corn oil, cottonseed oil, rapeseed oil, peanut oil, mono-, di-, or triglycerides, lecithin, edible essential oils, sesame oil, edible alcohols, hydrogenated or partially hydrogenated fats or oils, polyoxyethylene sorbitan esters, limonene, edible animal fats or oils, mixtures thereof, and edible derivatives thereof; such a process, wherein fine particulate solids are filtered or centrifuged from the extract and alternatively discarded, returned to a mixing or pressing stage of the process, or incorporated in the final residual solids; such a process which includes the steps of hydrating the final extract to add water to the extent of 5% to 200% by weight of the gums and fine particulate solids therein and filtering or centrifuging to remove said gums and solids; such a process including the step of returning separated hydrated gums and solids to the final residual solids; such a process, including the step of rehydrating the final residual solids with water to a water activity greater than 0.3 $A_w$ for color stabilization thereof; such a process, wherein the solids are rehydrated to a water activity of about 0.4 to 0.6 $A_w$; such a process, wherein an effective color-stabilizing amount of an edible antioxidant or chelator is included in the edible solvent; such a process, wherein the antioxidant comprises an antioxidant selected from the group consisting of lecithin, ascorbic acid, citric acid, tocopherol, ethoxyquin, BHA, BHT, TBHQ, tea catechins, sesame, and the antioxidant activity from an herb of the Labiatae family; such a process, wherein the antioxidant comprises a naturally-occurring antioxidant from an herb of the family Labiatae or powdered ascorbic acid; such a process, wherein the antioxidant comprises the antioxidant activity from an herb selected from the group consisting of rosemary, thyme, and sage, and such a process, wherein the temperature is above 180° F., and preferably between about 180° F. and about 235° F.

Moreover, an extract of plant solids of the genus Capsicum produced by the process having increased color stability due to the high temperature employed in its production; such an extract of plant solids of the genus Capsicum produced by the process having a high color value and a low bacterial count due to the high temperature employed in its production and due to a low water content of less than 6% in the starting Capsicum solids; and rehydrated cake solids produced by extraction of Capsicum solids according to the process having a high degree of color stability due to the high temperature employed in production thereof and due to the level of water activity $A_w$ present therein; and an extract of a plant of the genus Capsicum produced by the process in the form of a clear solution with gums and particulate solids therein converted to their insoluble hydrates and then removed from the extract; and a hydrated extract of a plant of the genus Capsicum produced in the process and having gums and particulate solids therein in their insoluble hydrated form; and finally an extract of plant solids of the genus Capsicum having improved color stability produced according to the process due to an edible antioxidant therein.

THE PRESENT INVENTION

IN GENERAL

Raw Capsicum spice solids, either ground (usually to pass US 40 mesh, and preferably to pass at least US 20 mesh) or unground if coarse particles are desired in the residual solid or cake, e.g., Capsicum solids having a moisture range of about 0.5% to 16% by weight, preferably 0.5 to 8%, and most preferably 1.5% to 6% by weight (ASTA method 2.0), are subjected to a mixing stage, preferably high shear, and in at least one stage an edible solvent is thoroughly dispersed throughout the raw plant material solids.

Typical Capsicum starting plant materials include, for example but without limitation, the dried ripe fruits of *Capsicum frutescens L.* (chilies), *Capsicum annum L.* (Spanish peppers), *Capsicum annum L.* var. longum Sendt, its hybrid Louisiana Sport Pepper, and Capsicum chinense (Scotch Bonnet or habenero), all by way of example and not by way of limitation.

The comminuted or uncomminuted plant material is subjected to a plurality of mechanical pressing stages, whereby a concentrated extract of principal components is obtained and a final utilizable and preferably standardized residual solid is produced. The selected edible solvent is introduced into the residual solid at a mixing stage at some point prior to the last pressing stage. The edible solvent, now containing extract, is cycled back to the previous stage, thus always supplying a solvent extract with increasing principal component concentration to the previous mixing and pressing stages. As the extract/edible solvent is passed through each stage countercurrent to the solids flow, a portion of the edible solvent is squeezed or pressed out, thereby extracting a portion of the principal components of interest. As the edible solvent/extract passes countercurrent to the solids, the extracted principal components are progressively concentrated in the extract in a continuous process and the residual principal components end up in the final residual solids known as the cake.

By varying the pressure, temperature, spice solids feed rate, solvent addition rate, and the number of mixing and pressing stages, the concentration of the principal components can be controlled in both the extract and the residual solid.

As will be apparent to one skilled in the art, variations in the process of the present invention can be employed to produce variations in result, the most advantageous of which are the production of both plant material extract of marketable potency and edible residual solid plant material also characterized by marketable potency. For example, using 200 ASTA paprika starting material of about 5% moisture, a 20% soy oil addition, and leaving a residual cake extractable yield of 9.8% by weight of the starting plant solids material, gives an extract with a color value of 850 ASTA and a residual cake color value of approximately 50 ASTA. Contrastingly, using a 10% soy oil addition (instead of 20%) yields a cake having about 65 ASTA color value and, by increasing the residual cake extractable yield to 12.5% by weight of starting plant solids material, the color value of the residual cake rises to about 100 ASTA and that of the extract to about 1400 ASTA. The lowest color extract for paprika normally traded is 1,000 ASTA.

Although less than 20% edible oil addition is highly desirable and can be used in many cases, with some edible solvent systems wherein the principal compounds of interest have a limited solubility, or when a more dilute extract and/or lower concentration of principal compounds is desired in the residual solids, more than 20% by weight of edible solvent addition will be required inasmuch as a suitable concentration of principal compounds in the finished extract and in residual solid can in some cases be produced only by the employment of the higher dilution.

Due to the successive treatments of high pressure and pressure relief, with pressures ranging from 6,000 to 30,000 PSI in the pressing stages of the operation, in the presence of added edible solvent, e.g., vegetable oil, and due to frictional heat generated in these high pressure zones, both the residual solid and the extract exiting the process surprisingly have a significantly reduced microbial load over that of the starting material even at moisture levels significantly lower than those indicated by the prior art and, also surprisingly, exhibit increased resistance to oxidative degradation of the carotenoid pigments which are responsible for the characteristic red-yellow color of Capsicums.

The extract from the first or any selected pressing stage may be centrifuged or filtered to provide the finished extract free of particulate solids. Preferably, the fine particulate solids and gums in the extract may be hydrated to about 5% to 200% by weight of the gums and solids prior to centrifugation or filtration to give a crystal clear extract. If water is not used to hydrate the solids and gums, the fine particulate solids from the extract may conveniently be combined with the final residual solids, recycled back into mixing and pressing stages of the process, or alternatively discarded. If water is used to hydrate the solids and gums, it is preferred that the solids and gums be added back to the final residual press solids or discarded.

The edible solvent employed according to the process of the present invention, as illustrated by the following Examples, may be any edible solvent and especially those selected from the group consisting of soybean oil, corn oil, cottonseed oil, rapeseed oil, sesame oil, peanut oil, mon-, di-, and triglycerides, lecithin, essential oils of spices, herbs, or other plants, edible alcohols, propylene glycol, glycerine, hydrogenated or partially hydrogenated fats or oils, limonene, polyoxyethylene sorbitan esters, or any other edible vegetable or animal fat or oil, or mixture thereof, or edible derivatives thereof, the essential aspects of the solvent being that it serves as an extraction aid in which the principal components of the material being extracted are soluble and that it be edible.

The edible solvent, according to the present invention, is combined with the raw material solids to be processed in a proportion of about 5% to about 50% by weight, and frequently amounts as low as 5 to 20% by weight are possible, based on the weight of the starting raw material solids to be extracted. The lower percentages frequently produce a more acceptable and marketable concentration of principal components of interest in both the extract and the residual solids.

The temperature to be employed during the processing and especially in the pressing stages of the process of the invention may be varied widely, but the process is generally carried out at a temperature below 450° F., and between about 130° F. and 325° F., most preferably above 180° F. and especially between about 180° F. and 235° F.

Temperatures in excess of 130° F. are advantageously employed to achieve acceptable yields and increased throughput rates as compared to the prior art. Higher temperatures are employed to control an increased degree of browning and, most importantly, to reduce the microbial load of both the solids and the extract while at the same time imparting increased resistance to oxidative degradation of the carotenoid pigments in both the extract and the residual solids. Thus, when it is desired that the residual solids from the process have a desirable darkened, caramelized appearance and/or flavor, a reduced microbial load, and increased resistance to oxidation, this is readily attained by increasing the temperature of the solids and the extract during the process, especially during the pressing stages thereof.

When an antioxidant or chelator is introduced into the process for protection of the spice being processed, this is preferably another plant material or an extract thereof, preferably of the Labiatae family, such as rosemary, thyme, or sage, which is known for its protective antioxidant activity (U.S. Pat. No. 5,209,870), or sesame, or tea catechins, but may alternatively be a suitable edible and preferably an approved food grade additive such as ethoxyquin, BHA, BHT, TBHQ, tocopherol, Vitamin C (e.g., as in U.S. Pat. Nos. 5,290,481, 5,296,249, or 5,314,686), citric acid, EDTA, or the like. The process of the present invention is particularly adaptable to the extraction of any Capsicum plant material solids containing carotenoid pigments or other components which provide color and/or flavor, pungency, or aroma to a food with which combined.

DETAILED DESCRIPTION OF THE INVENTION

The following examples are given to illustrate the present invention but are not to be construed as limiting.

EXAMPLE 1.

Paprika Extraction

Dehydrated paprika (5.5% moisture) is ground in a hammer mill and the resulting ground paprika (95% passing US 40 mesh) is admixed with about 10% by weight of soy bean oil and processed in a countercurrent extraction system involving three (3) pressing stages, each using an Egon Keller Model KEK-100 Screw Press, with the extracts from the second and third stages being returned to the preceding mixing stage before being removed from the process at the end of the first press stage. A high shear, high speed pin mixer or equivalent is used to mix the soy oil or extracts from the second and third press stages into the ground spice or residual solid from the preceding stage. This recycling is continuous. The raw material paprika solids are continuously fed at a rate of about 240 lbs. per hour with a total contact time in each mixing stage of about 15–60 seconds. The residence time in each press is 5–60 seconds. The pressing stages are operated at about 10,000 PSI internal pressure and about 200 degrees Fahrenheit, which is maintained by cooling with water through the bore of the press shafts. The starting color value of the ground paprika solids is 200 ASTA. The principal components extracted and standardized in both the extract and the residual solid are the carotenoid pigments. The resulting final soy-paprika extract has a color value of about 1,375 ASTA and the reground paprika residual solid from the final (3rd) press stage has a color value of about 85 ASTA.

EXAMPLE 1A

Variation

By varying the percentage of edible solvent employed from about 5% to 20%, the pressure from about 6,000 to 30,000 PSI, the number of countercurrent mixing and pressing stages from 2 to 5, with return of the extract from each press stage to the preceding mix stage before final removal from the process in the first press stage, varying the temperature from about 130° F. to 280° F., and removing the seed from the paprika solids prior to grinding, the resulting extract ranges in color value from about 2,700 ASTA to about 800 ASTA and the residual solids range in color value from 180 ASTA to 35 ASTA.

By regrinding the residual solids (from the final stage) just as is done with fresh, dehydrated paprika, a product in every way comparable to commercially available ground paprika solids is produced. After filtering or centrifuging off the fine particulate solids, the extract can be directly substituted for commercially available paprika oleoresin in every respect.

By varying the pressing temperature of the process from about 130° F. to 325° F., the hue of the reground residual solid is varied from slightly browned to a dark chocolate brown, demonstrating that the degree of brownness can be controlled by the pressing temperature employed. The degree of "brownness" is measured using a Hunter Labscan Spectrocolorimeter with 0 degree illumination, 45 degree circumferential viewing, illuminant D65, 10 degree observer, Ceilab coordinate system. The hue of the paprika powder is measured by placing the powder in a 2.5-inch diameter cuvette, shaking gently to ensure even coverage, and measuring through the bottom of the cuvette. The results of the varied operating temperatures of the process are shown in Table I. The designation L* is indicative of the "lightness" of the sample with the higher numbers being lighter or less browned, and the lower numbers being darker or more browned.

TABLE I

| Processing Temperature | Visual Appearance | L* Values |
|---|---|---|
| 130° F. | Red | 40.18 |
| 150° F. | Tan-Red | 37.25 |
| 200° F. | Light Brown Red | 33.22 |
| 280° F. | Dark Brown Red | 29.16 |
| 325° F. | Chocolate Red | 22.85 |

The data clearly demonstrate that the degree of browning can be controlled by varying the press temperature at which the process is conducted. This broadens the applications or uses of the residual solid to include a base for toasted chili powder and as a replacement for browned, caramelized paprika. The residual solid can be substituted for ground paprika or chili powder in many common applications and a separate processing step for browning to a desired degree is not required.

The starting ground paprika solids have an aerobic plate count (Analysis run according to Bacterial Analytical Manual By AOAC, 8th edition, 1995, and ISO-GRID Methods Manual, 3rd edition, 1989) of about 14,000,000. The residual solids exiting the extraction system have a count of about 2,000 to 200,000, with the lower count being achieved at the higher temperatures. This is a significant reduction and makes the residual solids per se suitable for any application where treatment with ethylene oxide or irradiation would normally be required.

EXAMPLE 1B

Antioxidant Addition

The foregoing example is repeated with all materials and conditions being the same, except that the soybean oil edible solvent is supplemented with an antioxidant blend at a concentration of 3% by weight of the original ground paprika solids. The blend consists of about 29% lecithin, 20% powdered ascorbic acid, 5% citric acid, 15% tocopherol, and 1% rosemary extract (in accordance with Chang and Wu U.S. Pat. No. 5,077,069).

The stability of (1) the resulting extract and (2) the residual solids is compared in each case with an untreated control. In such evaluation, the paprika extracts are plated on flour salt to an extent of 2.4% by weight with a mortar and pestle. Two-gram samples are weighed into 13×100 mm test tubes. The test tubes are stored in a thermostatically-controlled oven at 65° C. Samples are withdrawn periodically, extracted with acetone, and the color at 460 nm of a standard (%) dilution in acetone is determined spectrophotometrically. In the evaluation of the residual solids, two-gram samples of the reground residual solid are substituted for the flour salt dispersions.

The procedure for the "standard dilution" is as follows: The initial color of the dispersion is determined by pouring two grams of the original dispersion into a 100-ml flask. Acetone is added up to the 100-ml level. The flask is inverted several times. The flour salt is allowed to settle for five minutes. Then three ml of the dilution is pipetted into a 25-ml flask and diluted up to the 25-ml level. The absorbance is read at 460 nm. The 460 nm color is determined by the formula:

$$460 \text{ nm color} = \frac{(\text{absorbance at } 460/12)}{(\% \text{ dispersion}/100)}$$

where the percent dispersion is determined by the formuls:

$$\% \text{ dispersion} = \frac{\text{color units on the flour at } 460 \text{ nm}}{\text{color of the test sample at } 460 \text{ nm}}$$

to translate to ASTA color, multiply the 460 nm color by 820.

The color is plotted against time and the time for ⅓ of the starting color to fade is reported as the ⅔ life. This is a highly-reproducible measurement, which is sufficiently accurate to evaluate the effectiveness of the antioxidants and will assist the practitioner to optimize formulations for specific uses.

The final extract from the first press stage of the unprotected or unstabilized process has a color value of about 1375 ASTA and a ⅔ life of 6.5 hours as compared to a color value of about 1600 ASTA and a ⅔ life of 63 hours for the extract from the protected material. The color value of the unprotected or unstabilized residual solids is about 85 ASTA with a ⅔ life of 54 hours, compared to the protected solids which have a color value of about 95 ASTA and a ⅔ life of 155 hours. This clearly demonstrates that inclusion of antioxidants can improve not only the color yields from the extraction process but also at the same time improve the color stability of both the extract and the residual solids.

Other suitable antioxidants (e.g., lecithin, ethoxyquin, butylated hydroxy anisole (BHA), butylated hydroxy toluene (BHT), tertiary butyl hydroxy quinone (TBHQ), sesame, tea catechins, and Labiatae herb antioxidant activity, finely-divided ascorbic acid, tocopherol, citric acid) can be substituted in whole or in part for the specific antioxidant mixture employed with similar desirable color-protective results, preferably a naturally-occurring antioxidant from an herb of Labiatae family, e.g., rosemary, sage, or thyme, or powdered ascorbic acid.

EXAMPLE 2

Effect of Varying Operating Temperatures

Dehydrated paprika solids (2.5% moisture) were ground in a hammer mill and the resulting ground paprika (95% passing US 40 mesh) was processed with about 15% by weight of soy bean oil in a countercurrent extraction system as in Example 1 involving two (2) pressing stages, with extracts from the second press stage being returned to the preceding (first) mix stage before being removed from the process at the first press stage.

Upon exiting the first press stage, distilled water was metered continuously into the crude extract at a rate of 75% by weight of the gums and solids by means of an inline static mixer. The weight of the gums and fine particulate solids in the extract was determined by diluting one gram of the crude extract in nine grams of acetone. The mixture was spun down for three minutes at 2000 G's in a laboratory centrifuge. The solids separated were air dried and the weight of the gums and solids was calculated as a percentage of the weight of the starting extract. The hydrated gums and solids removed from the extract were continuously returned to the final residual press solids via a high shear, continuous pin mixer installed immediately following a water-jacketed cooling screw which received the residual solids from the second press stage.

Prior to hydration and centrifugation, the extract contained approximately 10% by weight of gums and fine particulate solids as determined by the above-described method. Following hydration and centrifugation the gums and particulate solids amounted to no more than 1% by weight of the extract and the extract was a crystal clear solution, free of any suspended insoluble materials.

The color value of the starting ground paprika was about 150 ASTA. The pressing stages were operated at about 20,000 to 30,000 PSI. The extraction process was started with the presses operating at about 80° F. as measured by the temperature of the cake exiting the presses. The temperature of the presses was controlled by the rate of flow of cooling water through the bore of the press shafts and the screen cages to keep the operating temperatures in the range of 80° to 180° F. Over the time of the extraction run, the operating temperatures of the presses, as measured by the temperature of the cake exiting the presses, was gradually increased to about 255° F. by first slowing and then stopping the flow of cooling water to obtain operating temperatures of 180–200° F., and then by substituting steam for the water in the shaft and cages at gradually increasing pressures to achieve temperatures of 200–255° F. Samples of the extracted oil and press residual solids were pulled at various temperature intervals as the temperatures were increased. Samples of the residual solids were pulled at two points, the first (non-rehydrated) immediately after exiting the cake-cooling screw following the final (second) pressing stage, and the second after the thus-cooled residual press solids were rehydrated to a moisture content of about 10%. The samples were assayed for ASTA color, aerobic and anaerobic plate count, and color stability over time using methods employed in Examples 1A and 1B.

The advantages of operating the process at a temperature above 130° F., as indicated by the temperature of the cake exiting the presses, can clearly be seen. The plate count of both the extract and the cake are progressively reduced as the temperatures are increased. (Tables 2 & 3)

TABLE 2

EFFECT OF INCREASING TEMPERATURES ON THE PLATE COUNT OF THE EXTRACT

| Temperature Degree F. | Aerobic Plate Count | Anaerobic Plate Count |
|---|---|---|
| 80 | 1,900,000 | 790,000 |
| 130 | 1,700,000 | 800,000 |
| 150 | 1,700,000 | 660,000 |
| 170 | 1,600,000 | 500,000 |
| 175 | 1,500,000 | 425,000 |
| 180 | 1,300,000 | 380,000 |
| 190 | 360,000 | 150,000 |
| 200 | 300,000 | 200,000 |
| 215 | 240,000 | 150,000 |
| 225 | 190,000 | 65,000 |
| 235 | 170,000 | 32,000 |
| 245 | 69,000 | 8,600 |
| 255 | 3,800 | 830 |

TABLE 3

EFFECT OF INCREASING TEMPERATURES ON THE PLATE COUNT OF THE PRESS SOLIDS

| Temperature Degree F. | Aerobic Plate Count | Anaerobic Plate Count |
|---|---|---|
| 80 | 220,000 | 55,000 |
| 130 | 160,000 | 35,000 |
| 150 | 160,000 | 25,000 |
| 170 | 100,000 | 20,000 |
| 175 | 32,000 | 15,000 |
| 180 | 80,000 | 7,400 |
| 190 | 3,500 | 800 |
| 200 | 9,800 | 3,400 |
| 215 | 5,800 | 2,300 |
| 225 | 4,100 | 500 |
| 235 | 1,900 | 1,100 |
| 245 | 5,400 | 100 |
| 255 | 800 | 100 |

The efficiency of extraction is dramatically improved as evidenced by the progressively decreasing ASTA values and the progressively decreasing residual extractable yields of the press residual solids. It is apparent that, to achieve residual extractable yields of less than about 20% by weight of the cake, it is necessary to operate the presses at 130° F. or higher. (Table 4) Moreover, for obvious reasons of efficiency, temperatures above 180° F., and especially between about 180° F. and about 235° F., are greatly preferred.

TABLE 4

PRESS CAKE ASTA AND RESIDUAL YIELDS AT PROGRESSIVELY INCREASING TEMPERATURES

| Temperature Degree F. | Press Solids ASTA | Press Solids Residual Yield |
|---|---|---|
| 80 | 87 | 28.28% |
| 130 | 76 | 16.40% |
| 150 | 65 | 15.72% |
| 170 | 61 | 15.72% |
| 175 | 53 | 12.36% |
| 180 | 43 | 13.88% |
| 190 | 42 | 10.84% |
| 200 | 44 | 10.72% |
| 215 | 41 | 9.96% |
| 225 | 39 | 9.50% |
| 235 | 33 | 9.28% |
| 245 | 32 | 9.00% |
| 255 | 35 | 9.80% |

Most importantly, the stability of the extract is not adversely affected and is in fact increased. The results, from Example 2, of an accelerated study on the stability of the extract, generated at varying press operating temperatures, can be seen in Table 5. The accelerated study was done according to the procedures described in Example 1B with the colors reported as a percent of the starting color for each respective sample to adjust for the varying color yields at the respective temperatures. These results demonstrate that the extract produced at higher operating temperatures exhibits increased resistance to oxidative color deterioration. This is surprising, as explained in the following.

TABLE 5

PRESS OLEORESIN (EXTRACT) STABILITY, ACCELERATED, 65° C.

| Temperature Degree F. | Hour 2 | Hour 4 | Hour 8 | Hour 12 | Hour 17 |
|---|---|---|---|---|---|
| 80 | 94% | 88% | 81% | 73% | 62% |
| 130 | 94% | 89% | 82% | 75% | 64% |
| 170 | 93% | 89% | 82% | 76% | 65% |
| 225 | 94% | 90% | 82% | 78% | 67% |
| 235 | 94% | 90% | 82% | 77% | 69% |
| 255 | 95% | 90% | 84% | 78% | 72% |

It is commonly believed that lipid-containing systems, exposed to heat, will exhibit an increased rate of lipid oxidation that, once initiated, will proceed at an ever-increasing rate. (*Rancidity and its Measurement in Edible Oils and Snack Foods, A Review*, Robards, Kerr, and Patsalides, *Analyst*, February 1988, Vol 113). In fact, prior art (U.S. Pat. No. 4,681,769) claims a process for counter-current, high pressure extraction of Capsicums at less than 100° F. and less than 500 PSI for the express reason of protecting the extracted oil from oxidation.

To confirm the positive effect of high temperature treatment in more controlled conditions, a forty gram sample of hexane-extracted oleoresin paprika, with no diluents added, was heated in a beaker on a heated stir plate at 100° C. for eight and one-half hours. A control sample which was unheated, a sample pulled from the heated beaker after four hours, and a sample of the material heated for the full eight and one-half hours were dispersed on flour salt to make dispersions of 1.2% oleoresin by weight of flour salt. Two gram-portions of the dispersions were weighed into test tubes and placed in a 65° C. oven. An initial ASTA color was run on each dispersion and then ASTA colors were run periodically and the results were plotted versus time to determine the relative stability of the heated and unheated samples. The results are shown in Table 6. It can be readily observed that the heat-treated samples, although they lose some initial color during the heating process, have improved stability over time, thus confirming the improved resistance to oxidation observed in Table 5.

TABLE 6

ASTA VALUES OF HEATED & UNHEATED OLEORESIN PAPRIKA (EXTRACT) OVER TIME

| Hours | Unheated | Heated 4 @ 100° C. | Heated 8 @ 100° C. |
|---|---|---|---|
| 0 | 32.5 | 31.5 | 26.0 |
| 2 | 29.0 | 29.0 | 25.8 |
| 4 | 26.0 | 28.0 | 25.7 |
| 6 | 24.0 | 27.0 | 25.5 |
| 8 | 22.5 | 25.8 | 25.3 |
| 10 | 21.0 | 24.5 | 25.0 |
| 12 | 20.0 | 23.0 | 24.8 |

TABLE 6-continued

ASTA VALUES OF HEATED & UNHEATED OLEORESIN PAPRIKA (EXTRACT) OVER TIME

| Hours | Unheated | Heated 4 @ 100° C. | Heated 8 @ 100° C. |
|---|---|---|---|
| 14 | 19.0 | 22.3 | 24.5 |
| 16 | 18.0 | 21.8 | 24.0 |
| 18 | 17.0 | 21.0 | 23.5 |
| 20 | 16.0 | 20.0 | 23.0 |
| 22 | 15.1 | 19.0 | 22.5 |
| 24 | 14.2 | 18.5 | 22.1 |
| 26 | 13.4 | 18.0 | 21.8 |
| 28 | 12.9 | 17.5 | 21.4 |
| 30 | 12.5 | 17.0 | 21.0 |

The non-rehydrated press residual solids produced in Example 2 exhibit decreased resistance to oxidative color loss as the press operating temperatures are increased as predicted by prior art (Bennett et al,U.S. Pat. No. 4,681,769) and as seen in Table 7.

TABLE 7

STABILITY OF NON REHYDRATED PRESS SOLIDS AT VARIOUS PRESS OPERATING TEMPERATURES, EXPRESSED AS PERCENT OF STARTING COLOR RETAINED

| Temperature Degree F. | Week 2 | Week 4 | Week 6 |
|---|---|---|---|
| 80 | 86.7% | 82.2% | 85.5% |
| 130 | 89.6% | 85.5% | 84.6% |
| 170 | 73.3% | 65.3% | 58.1% |
| 225 | 61.7% | 35.8% | 32.5% |
| 245 | 68.2% | 31.0% | 19.3% |

But, very importantly, it can be seen that the press residual solids which are rehydrated immediately after exiting the second press stage of the process (Example 2) exhibit significantly increased stability (Table 8) relative to the non-rehydrated solids, thus overcoming the claimed disadvantages from operating at temperatures above 100° F. as set forth in U.S. Pat. No. 4,681,769.

TABLE 8

STABILITY OF REHYDRATED PRESS SOLIDS AT VARIOUS PRESS OPERATING TEMPERATURES, EXPRESSED AS PERCENT OF STARTING COLOR RETAINED

| Temperature Degree F. | Week 2 | Week 4 | Week 6 |
|---|---|---|---|
| 80 | 90% | 92% | 91% |
| 130 | 93% | 91% | 92% |
| 170 | 92% | 92% | 91% |
| 225 | 94% | 93% | 91% |
| 245 | 95% | 94% | 93% |

In fact, after discounting for the effect on pigment stability of increasing residual extractable yields in the press solids (Tables 4 & 11) obtained at the lower temperatures, the carotenoid pigments in the residual solids would show enhanced stability for a given residual extractable yield. These are surprising and unexpected results and clearly overcome the supposed obstacle of operating at elevated press temperatures and pressures.

It is further surprising that the color stability of the residual press solids is significantly improved by controlling the water activity ($A_w$) of the solids in ranges above those suggested for the stabilization of lipidcontaining systems by extensive studies and particularly by Nelson and Labuza,

*Water Activity and Food Polymer Science: Implications of State on Arrhenius and WLF Models in Predicting Shelf Life*, K. A. Nelson & T. P. Labuza, *Journal of Food Engineering* 22, 271–289 (1994). Water activity is defined as the ratio of the vapor pressure of water in a food to the vapor pressure of pure water at the same temperature. Prior art suggests that maximum stability of lipid systems should be attained at water activities of about 0.3 with decreasing stability developing as the water activity is increased above this level. In this example we find precisely the inverse effect on stability of the carotenoid pigments for a given water activity.

In order to confirm the effect of high temperatures in the pressing operation, and to confirm the effect of added moisture, a controlled test was performed on a laboratory scale where the effect of levels of extractable yield in the cake could be controlled to eliminate the effect of variable press cake residual yields on the stability of the carotenoids. A 3,000 gram sample of ground paprika solids (175 ASTA, 9.8% extractable yield) was dried in a lab tray dryer at 100° F. for 16 hours to a moisture content of about 2%. One half of this sample was then heated in an oven at 220° F. for twenty minutes to approximate the temperature in a pressing operation according to the invention. The other unheated sample served as a control. One hundred gram samples of each of the two materials were rehydrated at approximately 1% intervals up to about 12% moisture. The water activity $A_w$ of each was determined using a Rotronics Hygroskop DT, model DT2/1-00IV, water activity instrument. Samples were weighed into sealed test tubes, stored at ambient temperatures of about 72° F. in the dark, and the ASTA colors were determined over a period of eighteen weeks to determine the relative rates of color degradation. The color retained (as a percentage of the starting color for each sample to compensate for the effect of color dilution with the rehydration water) was plotted against time.

TABLE 9

PERCENT COLOR RETAINED OF UNHEATED GROUND PAPRIKA AT VARIOUS WATER ACTIVITY RANGES

| Water Activity $A_w$ | Week 1 | Week 5 | Week 18 |
|---|---|---|---|
| 0.15 | 74% | 57% | 42% |
| 0.30 | 50% | 45% | 12% |
| 0.40 | 68% | 50% | 43% |
| 0.60 | 83% | 68% | 55% |

TABLE 10

PERCENT COLOR RETAINED OF HEATED GROUND PAPRIKA AT VARIOUS WATER ACTIVITY RANGES

| Water Activity $A_w$ | Week 1 | Week 5 | Week 18 |
|---|---|---|---|
| 0.15 | 66% | 56% | 41% |
| 0.30 | 60% | 50% | 45% |
| 0.40 | 80% | 62% | 57% |
| 0.60 | 98% | 82% | 78% |

Figure 2:
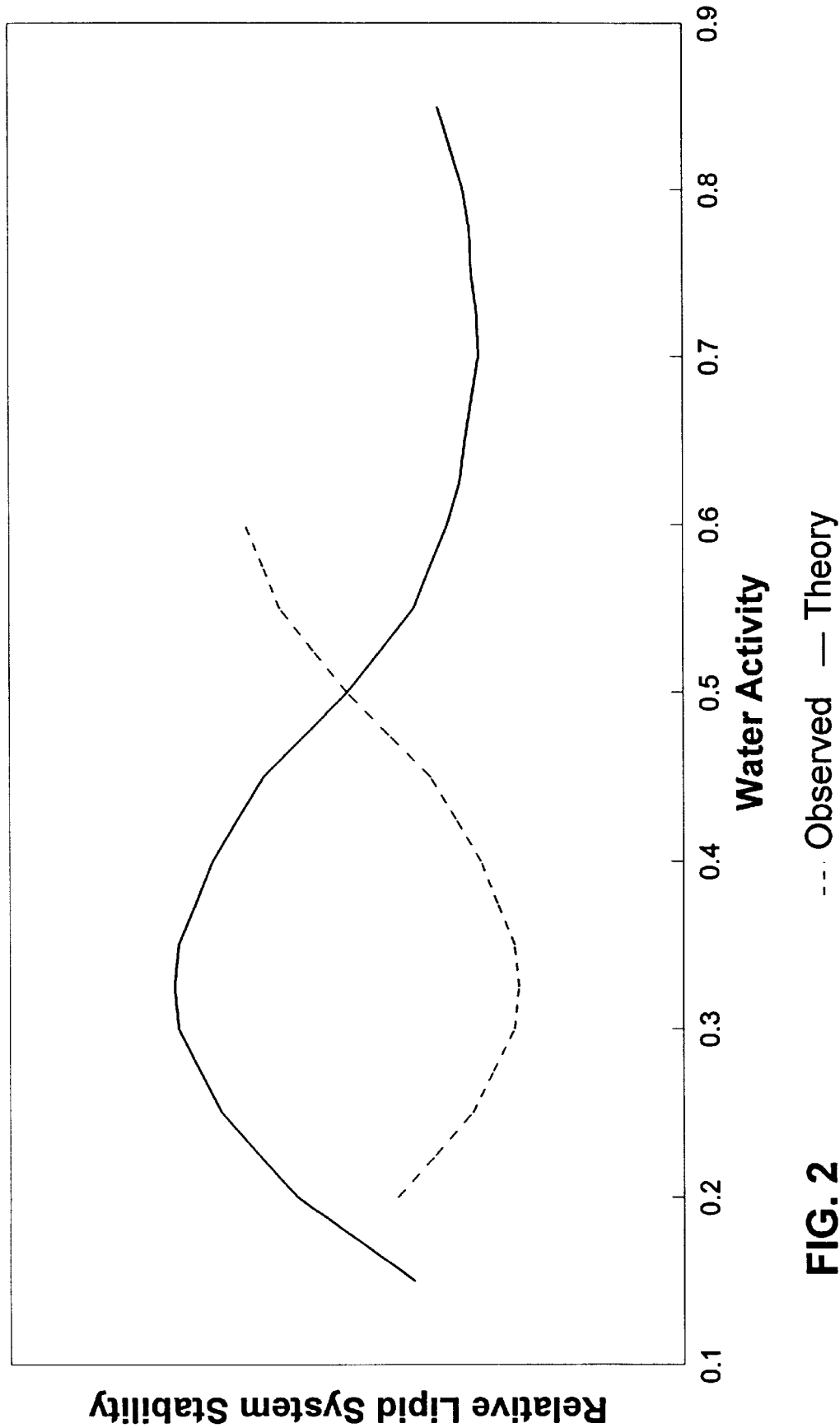
FIG. 2 illustrates the relationship between the water activity and relative lipid stability of food systems as incorrectly described in current literature and as currently found.

It can be seen in Tables 9 & 10 that the stability of the carotenoid pigments follows almost precisely the inverse of the curve predicted by Nelson & Labuza (FIG. 2). It can also be seen from these tables that controlled temperature (with concurrent browning) significantly enhances the stability of the carotenoids above a water activity of 0.3 and particularly in the water activity range of 0.4 to 0.6. Water activity ranges higher than 0.6 were not tested as levels marginally higher than this range will support microbial growth which is not acceptable in a dry spice product.

It can be concluded that the stability of the carotenoid pigments found in Capsicums unpredictably does not follow the commonly-accepted and predicted pattern for lipid oxidation with respect to temperature and water activity as suggested in U.S. Pat. No. 4,681,769, or in the cited literature (Nelson and Labuza, *Water Activity and Food Polymer Science: Implications of State on Arrhenius and WLF Models in Predicting Shelf Life*, K. A. Nelson & T. P. Labuza, *Journal of Food Engineering* 22, 271–289 (1994); *Rancidity and its Measurement in Edible Oils and Snack Foods, A Review*, Robards, Kerr, and Patsalides, *Analyst*, February 1988, Vol 113); describing the stability of lipid systems. In fact, high temperature treatment, combined with rehydration of the press solids to a water activity above 0.3, preferably of 0.4 to 0.6, significantly improves stability rather than decreases it. This is a very surprising and unpredicted result.

It is well known that the lipid profile of Capsicum and its extracts, without the addition of any diluents, comprises a mixture of saturated and unsaturated fatty acids, 60–70% being unsaturated linoleic and linolenic, *Lipid and Antioxidant Content of Red Pepper*, Daood, Biacs, et al., Central Food Research Institute, Budapest, Hungary (1989) and The Nature of Fatty Acids and Capsanthin Esters in Paprika, Nawar et al., Journal of Food Science, Vol. 36 (1971). In fact, Daood et al suggest that " . . . the presence of triglycerides containing high amounts of unsaturated fatty acids may be an important factor contributing to the fading of paprika during processing and storage." The present findings are Just the opposite. Without in any way being limited by theoretical considerations, it is hypothesized that the presently-discovered surprising and unpredicted inverse relationship shown (in Tables 9 & 10) between the stability of carotenoid pigments at given water activities is due to the fatty acids in the substrate being preferentially attacked by the oxidation reaction at the low (from about 0.05 to 0.2 $A_w$) and higher water activity ranges (above 0.3, preferably about 0.4 to 0.6 $A_w$), thus protecting the carotenoids. At the intermediate water activity ranges (0.2 to 0.4 $A_w$), where the lipids are best protected, the carotenoids are more readily and preferentially attacked and exhibit low resistance to oxidative degradation.

Another controlled test was conducted to demonstrate the effect of different extractable yields in the residual solid press cake. The effect of higher amounts of unsaturated fatty acids is evident from the results illustrated in Table 11 where fresh, refined, bleached, and deodorized soybean oil with no antioxidants was added at various percentages based on the weight of the paprika. The color over time was compared to the untreated control in an accelerated study at 65° C. A typical Refined, Bleached, and Deodorized soy oil has a fatty acid composition of 22.3% Oleic (18:1), 51% linoleic (18:2), and 6.8% linolenic (18:3). (*Riecel's Handbook of Industrial Chemistry*, 9th Edition, pg 278). It can be concluded that higher levels of unsaturated fatty acids, such as oleic, linolenic, and linoleic, which are found in most vegetable oils, will improve the color stability of the press residual solids. Levels of extractable yield in the residual solids above about 15–20% by weight of the residual solids is undesirable as the residual Capstcum solids become difficult to handle for most uses and the efficiency of extraction is reduced, i.e., less color can be removed from the spice as the residual yield is allowed to increase by decreasing either the pressure or temperature employed.

TABLE 11

PERCENT COLOR RETAINED WITH VARYING AMOUNTS OF SOY OIL ADDED TO GROUND PAPRIKA

| Percent Addition | Hour 2 | Hour 4 | Hour 6 | Hour 8 |
| --- | --- | --- | --- | --- |
| 0% | 65% | 59% | 52% | 50% |
| 5% | 90% | 83% | 74% | 72% |
| 10% | 92% | 84% | 75% | 74% |
| 15% | 94% | 87% | 80% | 78% |
| 20% | 96% | 91% | 83% | 81% |

It is readily apparent, comparing the results of the controlled test (Tables 9 & 10) on stability of heated vs unheated material, where oil is controlled at a constant level that, at a given added soy oil content in the press residual solids, the color stability of the residual press solids is significantly improved when the Capsicum has been exposed to higher temperatures. This conclusion is not readily apparent in the results shown in Table 8 where the amount of residual vegetable oil left in the press residual solids is higher in the low temperature ranges due to the decreased efficiency of the extraction process at lower temperatures (Table 4). The presence of higher amounts of residual oils there offers some protection which overshadows the increased protective effect at higher temperatures so evident in Tables 9 & 10.

It can therefore be concluded that much, if not all, of the protection offered by operating the presses at temperatures lower than 100° F. (as claimed in U.S. Pat. No. 4,681,769) as compared to temperatures above 100° F. is simply due to the higher residual oil levels (reduced extraction efficiency) and that, for any given residual oil content, and with rehydrated residual solids, the operating temperatures above 130° F. give superior results, not only in an increased extraction efficiency which allows for a continuous, high speed process with increased throughput rates and significantly reduced microbial activity, but most surprisingly in an increased color stability of both the extract and the residual press solids, particularly when the press solids are rehydrated.

COMPARATIVE EXAMPLE

According to Bennett U.S. Pat. No. 4.681.769,—
Low Temperature and Pressure

As can be seen in Table 4, the press solids residual yield is much higher at temperatures below 100° F. and much higher (28.3% residual yield) than disclosed in U.S. Pat. No. 4,681,769 (10–15% residual yield). In Example 2, Table 4, the Model KEK 100 Screw Press used for the test was operated at about 100% of its rated capacity of 240 pounds per hour for typical oil seeds. In an effort to more closely model the residual yields of 10–15% (oil) in the cake as disclosed in U.S. Pat. No. 4,681,769, the feed rate for this test was set at about 95 pounds per hour, thus allowing more residence time in the press to expel more extract and to reduce the residual yield of the press residual solids to 10–15%.

The following Example according to Bennett is a two-step production run.

One lot, comprising about 300 lbs of 160 ASTA chili, ground to pass 20 mesh (USSS), was transferred to a ribbon blender and blended with 13.7% by starting weight of the ground chili of fortified soybean oil having 500 ASTA oleoresin for about 15 minutes and then allowed to stand for about 16 hours at room temperature (75° F.) before transfer to the feed hopper of an Egon Keller Model KEK-100 Screw Press. The feed hopper provides for a controlled flow of the mixture of chili and fortified oil to the press at a rate of about 95 lbs per hour of fresh ground chili, the equivalent of about 800 lbs per hour in a French Oil Mill Machinery Company F-44 press. Both these feed rates represent about 40% of the rated capacity of the respective screw presses on whole oil seeds. The production run was started with a cone setting of about 0.030 inches and with the internal worms configured so as to provide a pressure gradient of essentially little or no pressure up to about 500 pounds per square inch of pressure. At these low pressures and feed rates, effluent oil temperatures were maintained at less than 100° F. with cooling water as in Bennett, and the residual yield (oil) in the press residual solids averaged about 12.5%, just as prescribed by Bennett, who states that:

"Temperatures above 100° F. should be avoided inasmuch as higher temperatures cause oxidation with a resultant destruction of delicate flavor and/or color principle."

With the press operating as described, the oil extracted, after centrifugation to remove the residual spice fines, assayed at about 1000 ASTA and the press cake residual solids fraction had a corresponding reduction in ASTA to about 115.

The press cake of the once-extracted ground fresh spice from the first pressing is further processed following the same procedure above described for the first blending/pressure extraction sequence using, however, fresh soybean oil as an additive in place of the fortified oleoresin soybean oil. The fortified soybean oil extracted assayed at approximately 500 ASTA. This 500 ASTA fortified soybean oil extract is recycled as an extractant on fresh ground chili. The extracted chili powder cake from this extraction step had a corresponding reduction in ASTA value to an average of about 65 ASTA (ranged from 41 to 95 ASTA).

The results of this low temperature, low pressure test are compared to results of high temperature, high pressure conditions in Example 2 and are shown in Table 12.

TABLE 12

Comparison of Low Temperature/Low Pressure and High Temperature/High Pressure

| | Low Temp/Low Pressure, 16 hour batch mixing | High Temp/High Pressure Continuous from Example 2 |
| --- | --- | --- |
| Temperature, Deg F. | 95 | 235 |
| Pressure, psi | <500 | 20,000–30,000 |
| Final Residual Solids ASTA | 65 | 33 |
| Final Residual Solids Yield | 12.5% | 9.3% |
| Final Residual Solids ASTA as a percent of Fresh Chili ASTA | 41.5% | 22% |
| ASTA loss in 1st mixing stage | 7% | 0% |
| ASTA loss in 2nd mixing stage | 10.5% | 0% |
| Final Oleoresin ASTA | 1,000 | 1,000 |

It can clearly be seen, as is also shown in Example 2 (Effect of Varying Operating Temperatures), that the low temperature/low pressure batch process with extended contact times incurs significant color loss during the extended contact times necessary for low temperature/pressure extraction. In addition, the low temperature/pressure batch process does not remove the color as efficiently as with higher temperatures and pressures for any given size pressing operation.

The foregoing example can scientifically be scaled up or extrapolated into a comparative two-stage production run using two Model 44-F French Oil Mill Machinery Company presses, as follows:

One lot comprising about 3,840 lbs of 5% moisture, 160 ASTA, 20 mesh, fresh ground chili solids (*Capsicum annum*) is passed through a high speed, high shear, steam-jacketed paddle mixer on a continuous basis and fed directly into the press feed hopper at stage one, through the 1st stage press, into a 2nd stage paddle mixer, and then to the 2nd stage press. Soybean oil is added continuously through a metering pump into the paddle mixer at stage 2 at the rate of 13.7% by weight of the starting ground chili solids (525 lbs of oil for the 3840 lb run). The raw material chili solids are continuously fed at a rate of about 2,500 lbs per hour to the system with a total contact time in each paddle mixer of about 15 seconds. The temperature of the chili/oil mix exiting the paddle mixer is maintained at about 180° F. at stage 2 and about 150° F. at stage 1.

The oil/extract expelled from the second pressing stage is returned on a continuous basis to the paddle mixer at stage one wherein the oil/extract and fresh ground paprika are mixed in preparation for the first pressing stage. The oil/extract and fresh ground paprika exit the first stage paddle mixer and enter the first stage press at about 150° F., the temperature being controlled by the amount of steam on the paddle mixer jacket.

The concentrated oil/extract expelled from the first pressing stage is hydrated with water to about 75% by weight of the fines (fine particulate solids) and gums and is then centrifuged and the hydrated fines and gums are added to the residual press solids from the final (second) pressing stage in a high shear mixer, after the solids have passed through a water-jacketed cooling screw.

The internal shaft and collar arrangements of the press are configured so as to provide internal pressures of about 20,000 to 30,000 PSI and cooling water is maintained at a flow rate through the bore of the shaft and through the cage cooling jackets so as to maintain an exit oil temperature at the external cage surface of about 180 to 200° F. and an exiting residual solid cake temperature of about 235° F. The residual cake solid is cooled in a water-jacketed screw conveyor to about 85° F. and water, in addition to the hydration water used to remove the fines and gums from the extract, is injected into the high shear, continuous mixer to rehydrate the cake to a water activity of about 0.6.

The concentrated extract exiting press stage one has an ASTA value of about 1,000 and the residual press solid cake exiting stage two has an ASTA value of about 45. The residual press solid cake has a reddish-brown appearance typical of lightly toasted chili powder. The aerobic plate count of the residual solid cake is about 70,000.

The same test is repeated (according to the Bennett Example). No heat is applied during the mixing stages and the press internals are reconfigured so as to provide for minimal friction and compression and the resultant minimal heat generation during the pressing operations. The working compression is supplied primarily by the cone at the cake discharge and is maintained at about 500 PSI. Oil is added at a rate of about 13.7% by weight of the starting paprika solids (525 lbs for the 3840 lb batch) and mixed in a ribbon blender for sixteen hours and then fed at ambient temperature (about 75° F.) to the pressing system. The feed rate through the pressing stages is maintained at 800 pounds per hour. Cooling water is supplied to the internal bore of the shafts and the cooling jackets to maintain exit oil temperatures of less than 100° F., on both the expelled oil and the residual press cake. The extract exiting the first pressing stage of the press is centrifuged without hydration of the gums and fine particulate solids.

The concentrated extract exiting press stage one has an ASTA value of about 1,000 and the residual cake solid has an ASTA value of about 65. The appearance of the cake is lacking the brownness characteristic of commercially-available ground paprika and chili powder and would require a separate browning step to make it acceptable for common uses. The material is difficult to regrind due to the high level of residual extractable yield left in the cake, it is not flowable, and it must be combined with other solid materials to make an acceptable product for sale. The aerobic plate count is about 220,000. A comparison of the results of the two tests is shown in Table 13.

TABLE 13

|  | High Temperature Pressing | Low Temperature Pressing |
|---|---|---|
| Mixing Time, Soy Oil | Continuous, (Seconds) | 16 Hours |
| Fresh Oil Temp, ° F. | 75 | 75 |
| Oil/Chili Stage 1 at Press Feed, ° F. | 150 | 75 |
| Oil/Chili Stage 2 at Press Feed, ° F. | 180 | 75 |
| Cake after Stage 1 Pressing, ° F. | 225 | 95 |
| Cake after Stage 2 Pressing, ° F. | 235 | 95 |
| ASTA Value, Extract | 1000 | 995 |
| 2/3 Life, Extract, 65° C., Hours | 25 | 16 |
| ASTA Value, Press Cake | 45 | 65 |
| 2/3 Life, Cake, 72° F., Weeks | 32 | 10 |
| Color Recovery, Extract | 75% | 51% |
| Aerobic Plate Count, Extract | 70,000 | 2,000,000 |
| Aerobic Plate Count, Cake | 2,000 | 220,000 |
| Overall Color Recovery (Extract and Cake) | 98% | 91% |
| Visual appearance, Cake | Red-brown | Red-tan |
| Throughput rate, lbs per hour | 2,500 | 800 |

It is readily apparent that there are substantial advantages to higher temperatures and pressures. The color recovery is enhanced, there is a 50% increase in yield to the extract, the rate for a given press size is increased by over 300%, the color stability of the extract is improved by 65%, the color stability of the residual solids cake is improved by 300%, and the aerobic plate count is reduced by a factor of greater than 30 in both the extract and the residual cake; all without the oxidative color losses that are alleged to be an obstacle in U.S. Pat. No. 4,681,769.

It is thereby seen that an improved countercurrent process for the extraction of Capsicum solids using an edible solvent, whereby improved yields of both extract and residual solids are obtained, whereby both the extract and the residual solids have improved color stability and freedom from bacterial contamination due to the higher temperatures employed, whereby due to optional advantageous rehydration of residual solids and level of water activity employed an improved color stability in the residual solids is attained, whereby an extract in the form of a clear solution can be obtained by removal of gums and particulate solids in the form of their insoluble hydrates, whereby even greater color stability can be effected by the employment of edible antioxidants in the solvent utilized, and whereby controlled browning of the residual solids may be conveniently effected, all without the expected disadvantages of employing higher temperatures as clearly indicated by the prior art, and whereby all of the stated objects of the invention have been accomplished, has been provided.

It is to be understood that the invention is not to be limited to the exact details of operation, or to the exact compositions, methods, procedures, or embodiments shown and described, as obvious modifications and equivalents will be apparent to one skilled in the art, and the invention is therefore to be limited only by the full scope which can be legally accorded to the appended claims.

I claim:

1. The oil-insoluble hydrated gums and fine particulate solids separated from an extract of a plant of the genus Capsicum, produced by a process comprising the following steps:

subjecting Capsicum plant solids having a moisture content less than 6% by weight, to a countercurrent extraction process involving a plurality of mixing and pressing stages, including first and last mixing stages and first and last pressing stages, together with five to about fifty percent by weight of an edible solvent, to produce an extract and residual solids, all pressing stages being carried out at a temperature of at least 130° F. and at a pressure of about 6,000 to 30,000 psi, and then hydrating the extract by adding water to the extent of 5% to 200% by weight of gums and fine particulate solids therein, and filtering or centrifuging to isolate said insoluble hydrated gums and fine particulate solids.

2. The product of claim 1 wherein the Capsicum plant is paprika.

* * * * *

UNITED STATES PATENT AND TRADEMARK OFFICE
CERTIFICATE OF CORRECTION

PATENT NO. : 6,074,687
DATED : June 13, 2000
INVENTOR(S) : George N. Todd

It is certified that error appears in the above-identified patent and that said Letters Patent is hereby corrected as shown below:

Column 10, line 33(approx): The word "muls:" should read: -- mula: --. Page 18, line 29

Signed and Sealed this

First Day of May, 2001

Attest:

NICHOLAS P. GODICI

Attesting Officer         Acting Director of the United States Patent and Trademark Office